United States Patent
Liu et al.

(10) Patent No.: US 10,248,115 B2
(45) Date of Patent: Apr. 2, 2019

(54) PATROL-TYPE PREVENTIVE INSPECTION SYSTEM FOR ELECTROMECHANICAL DEVICES

(71) Applicants: TECOM CO., LTD., Hsin-Chu (TW); TECO Electric & Machinery Co., Ltd., Taipei (TW)

(72) Inventors: Chao-Kai Liu, Hsin-Chu (TW); Chun-Hung Chen, Hsin-Chu (TW); Han-Lin Ku, Hsin-Chu (TW)

(73) Assignees: TECOM CO., LTD., Hsin-Chu (TW); TECO ELECTRIC & MACHINERY CO., LTD., Taipei (TW)

( * ) Notice: Subject to any disclaimer, the term of this patent is extended or adjusted under 35 U.S.C. 154(b) by 0 days.

(21) Appl. No.: 16/041,681

(22) Filed: Jul. 20, 2018

(65) Prior Publication Data
US 2018/0329405 A1    Nov. 15, 2018

Related U.S. Application Data

(63) Continuation-in-part of application No. 15/725,269, filed on Oct. 4, 2017, now abandoned.

(30) Foreign Application Priority Data

Nov. 25, 2016  (TW) .............................. 105138819 A

(51) Int. Cl.
G05B 23/00   (2006.01)
G05B 23/02   (2006.01)
(Continued)

(52) U.S. Cl.
CPC ...... *G05B 23/0272* (2013.01); *G05B 23/0216* (2013.01); *G05B 23/0283* (2013.01); *G06Q 10/20* (2013.01); *G07C 1/20* (2013.01)

(58) Field of Classification Search
CPC ............................ G05B 23/00; G05B 23/0272
(Continued)

(56) References Cited

U.S. PATENT DOCUMENTS

2002/0162117 A1    10/2002  Pearson et al.
2004/0097195 A1    5/2004   Selleck
(Continued)

*Primary Examiner* — Qutbuddin Ghulamali
(74) *Attorney, Agent, or Firm* — Muncy, Geissler, Olds & Lowe, P.C.

(57) ABSTRACT

A patrol-type preventive inspection system is provided for an inspection personnel to perform a patrol-type inspections upon a plurality of electromechanical devices located along a patrol path. In the patrol-type preventive inspection system, a portable inspection-device kit and a portable communication device are carried by the inspection personnel to a to-be-inspected position of a to-be-inspected electromechanical device out of the electromechanical devices along the patrol path, so as to perform a patrol-type inspection upon the to-be-inspected electromechanical device for obtaining at least one inspection data. When the inspection data complies with at least one preventive inspection standard, the portable communication device is provided for the inspection user to perform an interactive operation to generate a real rapid-screening result, further to generate a preliminary treatment suggestion, and to re-plan the patrol path.

8 Claims, 13 Drawing Sheets

(51) Int. Cl.
*G07C 1/20* (2006.01)
*G06Q 10/00* (2012.01)

(58) Field of Classification Search
USPC .......................................................... 340/521
See application file for complete search history.

(56) References Cited

U.S. PATENT DOCUMENTS

| | | |
|---|---|---|
| 2005/0086227 A1 | 4/2005 | Sullivan et al. |
| 2016/0163186 A1* | 6/2016 | Davidson .............. G06Q 50/16 340/506 |
| 2017/0357253 A1* | 12/2017 | Kilpatrick .......... G05B 23/0264 |
| 2018/0032068 A1* | 2/2018 | Higgins ................ G05B 17/02 |

* cited by examiner

PATROL-TYPE PREVENTIVE INSPECTION SYSTEM FOR ELECTROMECHANICAL DEVICES

CROSS-REFERENCE OF RELATED APPLICATION

This application is a Continuation-in-Part of U.S. patent application Ser. No. 15/725,269, which was filed on Oct. 4, 2017 and is presently pending.

BACKGROUND OF THE INVENTION

1. Field of the Invention

The invention relates to an inspection system, and more particularly to the inspection system that makes an inspection personnel able to execute patrol-type preventive inspections upon a plurality of electromechanical devices on a patrol path.

2. Description of the Prior Art

With variety developments in business patterns, plenty of industrial and/or commercial electromechanical devices in versatile fields usually need specific inspection personnel to perform thereupon regular and/or irregular preventive inspections, and thus possible shutdown of individual electromechanical devices that could influence business operations can be reduced to a minimum. To those large-scale manufacturing enterprises, since the electromechanical equipments are spread all over different factory sites, thus a special maintenance and service department shall be established to take charge of the preventive inspections. Generally, each inspection personnel in the maintenance and service department shall be in charge of a big number of the electromechanical equipments.

To a company that specializes in providing maintenance and service for various electromechanical devices, a considerable number of inspection personnel are required to provide different inspection tasks upon various electromechanical devices in accordance with different maintenance and service contracts with individual clients. Under these circumstances, each inspection personnel might not be able to fix his/her schedule upon specific electromechanical devices. Especially, in the case that one of the inspection personnel originally in charge is off or out of town, his/her substitute may not be familiar with positions, current states and historical records of the new electromechanical devices, and thus the related inspections thereupon would become much nasty and difficult.

To ease the aforesaid situations, internet of things (IoT) and/or remote monitoring technology are usually introduced. Generally, plural on-site inspection devices would be mounted onto each of the electromechanical devices, and thus each the inspection device can transmit corresponding inspection data to a cloud service periodically for further management processes. However, some problems are usually emerged upon when the internet of things (IoT) and the remote monitoring technology are integrated.

The first problem to face immediately is related expense on purchasing, installing and calibrating these on-site inspection devices. The second problem is the arrangements for transmitting inspection data generated by these on-sites inspection devices to the cloud servers through the IoT, from which a huge load upon network resources in data calculation may rise. The third problem need to face is the connection of the IoT. Since effective monitoring can't be provided unless the inspection devices are connected successfully with the IoT, so if the electromechanical device is not well connected with the IoT (for example, the electromechanical device is located in a metal shield, not covered by any communication cell, or facing a bad weather), the cloud server may not be able to capture completely the inspection data of the electromechanical devices.

Hence, it is necessary and worthy to come up with an improvement upon the inspection system by replacing the conventional IoT and the remote monitoring technology with a new patrol-type inspection means, such that the inspection system is able to provide initiatively the inspection personnel with the positions of the electromechanical devices, as well as the patrol paths thereto.

SUMMARY OF THE INVENTION

In view of the aforesaid shortcomings of the art in obtaining positions, inspection states and historical data of the electromechanical devices, of the cost in purchasing, installing and calibrating the on-site inspection devices, of the huge load upon network resources in data calculation, and of the requirements in fulfilling network communication and monitoring; accordingly, it is an object of the present invention to provide a patrol-type preventive inspection system for electromechanical devices for resolving all the aforementioned shortcomings simultaneously. The patrol-type preventive inspection system of the present invention is able to provide initiatively the inspection personnel with positions of plural electromechanical devices, as well as the corresponding patrol path thereto.

In the present invention, the patrol-type preventive inspection system includes a portable inspection-device kit, a memory module and a portable communication device. The portable inspection-device kit, provided for the inspection personnel to carry along the patrol path to a to-be-inspected position of a to-be-inspected electromechanical device out of the plurality of electromechanical devices, includes at least one inspection device and an inspection-data collecting and transmitting device. The at least one inspection device is mounted onto at least one to-be-inspected portion of the to-be-inspected electromechanical device so as to detect at least one inspection data of the to-be-inspected electromechanical device. The inspection-data collecting and transmitting device, communicatively coupled with the at least one inspection device, is to collect and transmit the at least one inspection data.

The memory module, communicatively coupled with the inspection-data collecting and transmitting device so as to receive and store the at least one inspection data, records a plurality of electromechanical-device positions respective to the plurality of electromechanical devices, and also record a basic electromechanical-device information and at least one preventive inspection standard of each of the plurality of electromechanical devices. Each of the at least one preventive inspection standard is respective to a rapid-screening confirmation item data, the rapid-screening confirmation item data records a plurality of rapid-screening results, and each of the plurality of rapid-screening results is respective to a preliminary treatment suggestion.

The portable communication device, provided for the inspection personnel to carry with the portable inspection-device kit to the to-be-inspected position, includes a track-requirement analyzing module, a user interface module, a maintenance-period evaluating module, a positioning module and a patrol-path planning module.

The track-requirement analyzing module, communicatively coupled with the memory module and the inspection-data collecting and transmitting device, is to capture at least one rapid-screening confirmation item data and to define the to-be-inspected electromechanical device as a special-track electromechanical device upon when the at least one inspection data reaches the at least one preventive inspection standard. On the other hand, the track-requirement analyzing module is to define the to-be-inspected electromechanical device as a regular-track electromechanical device upon when the at least one inspection data doesn't reach the at least one preventive inspection standard.

The user interface module, electrically coupled with the track-requirement analyzing module and the memory module, is to display the rapid-screening confirmation item data, for the inspection personnel to perform an interactive operation so as to generate a real rapid-screening result out of the plurality of rapid-screening results, to display one of the plurality of preliminary treatment suggestions with respect to the real rapid-screening result so as for the inspection personnel to read, and to perform a preliminary treatment operation and store data of a preliminary treatment operation into the memory module to form a processing historical data.

The maintenance-period evaluating module, electrically coupled with the track-requirement analyzing module, is to evaluate the at least one inspection data and the at least one preventive inspection standard to determine a priority maintenance period of the special-track electromechanical device upon when the track-requirement analyzing module analyzes that the at least one inspection data has reached the at least one preventive inspection standard, to evaluate the at least one inspection data and the at least one preventive inspection standard to determine a regular maintenance period of the regular-track electromechanical device upon when the track-requirement analyzing module analyzes that the at least one inspection data has not reached the at least one preventive inspection standard, and to record the priority maintenance period and the regular maintenance period into the memory module.

The positioning module is to position the plurality of electromechanical-device positions so as to obtain a plurality of electromechanical-device coordinates, provided to position the portable communication device so as to obtain a communication-device coordinate. The patrol-path planning module, electrically coupled with the maintenance-period evaluating module and the positioning module, is to re-plan the patrol path according to the communication-device coordinate, the plurality of electromechanical-device coordinates, the priority maintenance period or the regular maintenance period of the to-be-inspected electromechanical device.

Preferably, the memory module can be furnished in the portable communication device, or backup the inspection data to a remote server via a backup means, such that the patrol-type preventive inspection system can still operate even in a situation that the inspection-data collecting and transmitting device or the portable communication device fails to communicatively couple a remote server. The at least one preventive inspection standard stores in the memory module includes at least one of a preventive voltage-inspection standard, a preventive current-inspection standard, a preventive temperature-inspection standard, a preventive vibration-inspection standard and a preventive power-inspection standard.

Preferably, the rapid-screening confirmation item data stored in the memory module includes a plurality of rapid-screening confirmation items, each of the plurality of rapid-screening confirmation items is respective to a related inspection data and a supportive judgment-alerting message in the at least one inspection data, and the user interface module includes a display interface and an operation interface. The display interface is provided for displaying the rapid-screening confirmation item. The operation interface is provided for the inspection personnel to perform the interactive operation. While in performing the interactive operation, when the inspection personnel clicks one current confirmed item out of the plurality of rapid-screening confirmation items, the track-requirement analyzing module captures the related inspection data and the supportive judgment-alerting message from the memory module with respect to the current confirmed item, and displays the related inspection data and the supportive judgment-alerting message on the display interface.

Preferably, the memory module further stores a map data, the patrol-path planning module further marks the patrol path on the map data so as to form a patrol-type map data, and the patrol-type map data is stored in the memory module, so that, when the inspection personnel operates the user interface module, the patrol-type map data is displayed on the user interface module.

Preferably, the patrol-path planning module further captures one of the plurality of electromechanical-device coordinates with respect to the special-track electromechanical device so as to obtain a special-track electromechanical-device coordinate upon when the track-requirement analyzing module defines the to-be-inspected electromechanical device to be the special-track electromechanical device, a special-track flag is marked at the special-track electromechanical-device coordinate in the patrol path, and the patrol-type map data and the special-track flag are displayed on the user interface module upon when the inspection personnel operates the user interface module.

Preferably, the user interface module further displays the processing historical data of the special-track electromechanical device with respect to the special-track flag upon when the user interface module detects that the inspection personnel clicks the special-track flag.

Preferably, the inspection-data collecting and transmitting device is a gateway, and communicatively coupled with the portable communication device through a nearby wireless communication technology; wherein the nearby wireless communication technology is one of a WiFi wireless communication technology, a Bluetooth wireless communication technology and a Zigbee wireless communication technology.

Preferably, the user interface module further includes a report-producing interface, the report-producing interface is provided for the inspection personnel to operate and capture at least one of the basic electromechanical-device information, the at least one inspection data, the real rapid-screening result, the processing historical data, the priority maintenance period, the regular maintenance period and the patrol-type map data stored in the memory module so as to generate a patrol-type inspection report.

As stated above, the patrol-type preventive inspection system for electromechanical devices provided by the present invention can reach at least the following advantages. Firstly, in the patrol-type preventive inspection system, since the patrol-path planning module can be used to plan the patrol path, and further the user interface module can obtain the basic electromechanical-device information, the processing historical data and the patrol-type map data from the memory module; thus, any inspection personnel, familiar with the real situations or not, can be rapidly aware where to find the electromechanical device, and what the inspection and the situation to be handled are, such that better flexibility in personnel arrangement can be provided.

Secondly, in the patrol-type preventive inspection system, since the portable inspection-device kit and the portable communication device are carried by the inspection personnel to travel along the patrol path, thus no in-situ inspection device is needed to each electromechanical device. Thereby, expense on purchasing, installing and calibrating the inspection devices can be significantly reduced. In addition, the portable communication device can be used to perform nearby statistic calculations and path planning, and thus calculation load of data resources at the remote server can be substantially relieved.

Thirdly, since the inspection device and the inspection-data collecting and transmitting device of the portable inspection-device kit and the portable communication device are also carried by the inspection personnel to travel along the patrol path, the patrol-type preventive inspection system can still work, even at a situation of losing network connection with a remote server. According to the present invention, as long as the inspection personnel brings the inspection-data collecting and transmitting device and the portable communication device to a place that a network connection with the remote server can be established, then all the inspection data as well as other related information can be still forwarded to the remote server. Thus, even under severe circumstances without reliable network or communication connection, monitoring and management upon plenty electromechanical devices can be still performed.

All these objects are achieved by the patrol-type preventive inspection system for electromechanical devices described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a patrol-type preventive inspection system for electromechanical devices. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Since the patrol-type preventive inspection system provided by the present invention can be widely applicable to various types of electromechanical devices, thus it can be foreseen that versatile and plenty of embodiments or exemplary combinations can be formed. However, in the following description, only one of the preferred embodiments is raised to elucidate the present invention, and the rest thereof would be omitted herein.

Figure 1:
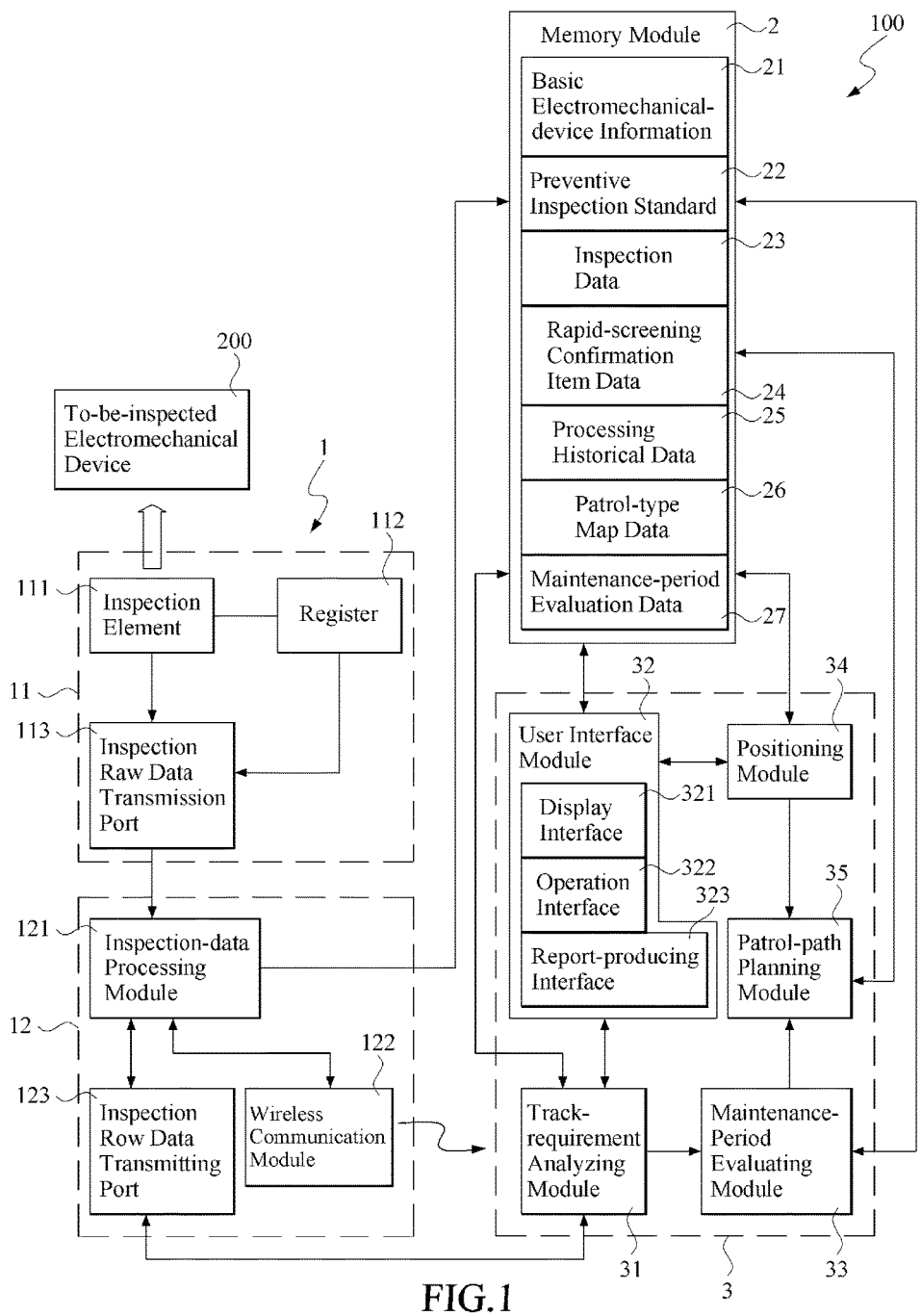
FIG. 1 is a schematic function-block view of a preferred patrol-type preventive inspection system for electromechanical devices in accordance with the present invention.

Referring now to FIG. 1, a schematic function-block view of a preferred patrol-type preventive inspection system for electromechanical devices in accordance with the present invention is shown. In this embodiment, the patrol-type preventive inspection system for electromechanical devices (the patrol-type preventive inspection system, thereafter) 100 is to provide an inspection personnel to perform patrol-type inspections upon a plurality of electromechanical devices along a patrol path (referred to FIG. 9 and FIG. 10). In FIG. 1, only a to-be-inspected electromechanical device 200 out of the plurality of electromechanical devices is shown and labeled.

The patrol-type preventive inspection system 100 includes a portable inspection-device kit 1, a memory module 2 and a portable communication device 3. The portable inspection-device kit 1 is to be carried by the inspection personnel to a to-be-inspected position of the to-be-inspected electromechanical device 200 out of the plurality of electromechanical devices in accordance with a scheduled patrol path. The portable inspection-device kit 1 includes at least one inspection device 11 and an inspection-data collecting and transmitting device 12. The to-be-inspected electromechanical device 200 can be a motor, a generator or any electromechanical device the like. In this embodiment, the to-be-inspected electromechanical device 200 is a motor.

The at least one inspection device 11 is mounted to at least one to-be-inspected portion on the to-be-inspected electromechanical device 200 so as thereby to detect at least one inspection data of the to-be-inspected electromechanical device 200. Each the inspection device 11 includes an inspection unit 111, a register 112 and an inspection raw-data transmission port 113. The inspection unit 111 can include at least one of a vibration detector, an electricity-inspecting element (for testing a voltage, a current and/or a power) and a temperature-inspecting element. In this embodiment, the inspection unit 111 includes all of the aforesaid three elements. By providing the inspection unit 111 to the to-be-inspected electromechanical device 200, at least one inspection data regarding the vibration, the voltage, the current, the power and the temperature can be detected.

The inspection data regarding the vibration, the voltage, the current, the power and the temperature detected by the inspection unit 111 is generally stored into the register 112 in a raw-data format, and can be further transmitted to the inspection-data collecting and transmitting device 12 through the inspection raw-data transmission port 113.

The inspection-data collecting and transmitting device 12 is communicatively coupled with the inspection device 11. In this embodiment, the inspection-data collecting and transmitting device 12 can be a gateway, and is wired to the inspection raw-data transmission port 113. The inspection-data collecting and transmitting device 12 can include an inspection-data processing module 121, an inspection row-data transmission port 122 and a wireless communication module 123. The inspection-data processing module 121 can be a data processor for performing a statistical calculation upon the inspection data transmitted by the inspection raw-data transmission port 113, such that the inspection data can be transformed into a row-data format.

Both the inspection row-data transmission port 122 and the wireless communication module 123 are electrically coupled with the inspection-data processing module 121. The inspection personnel can apply a cable to connect communicatively the inspection row-data transmission port 122 and the portable communication device 3, or introduce the wireless communication module 123 to communicatively couple the portable communication device 3, according to a nearby wireless communication technology. In the present invention, the nearby wireless communication technology can be one of a WiFi wireless communication technology, a Bluetooth wireless communication technology and a Zigbee wireless communication technology. Through the aforesaid communication coupling technology, the inspection data, after the statical calculation by the inspection-data processing module 121, can be transmitted to the portable communication device 3. Thereupon, the inspection-data collecting and transmitting device 12 can collect and transmit the inspection data.

The memory module 2, communicatively coupled with the inspection-data collecting and transmitting device 12, can be built in the portable communication device 3, for recording a plurality of electromechanical-device positions with respect to the electromechanical devices, and a basic electromechanical-device information 21 and at least one preventive inspection standard 22 for each the electromechanical device. The preventive inspection standard 22 is defined as an inspection standard to evaluate that the electromechanical device still can normally operate for a predetermined period, such as one week or one month, before damage or broken. The meaning of complying with the preventive inspection standard 22 implies the evaluation that the electromechanical device will be damaged or broken within the predetermined period. The basic electromechanical-device information can include a brand, a manufacturing date, a pattern code, a serial number and a specification of the electromechanical device.

Figure 2:
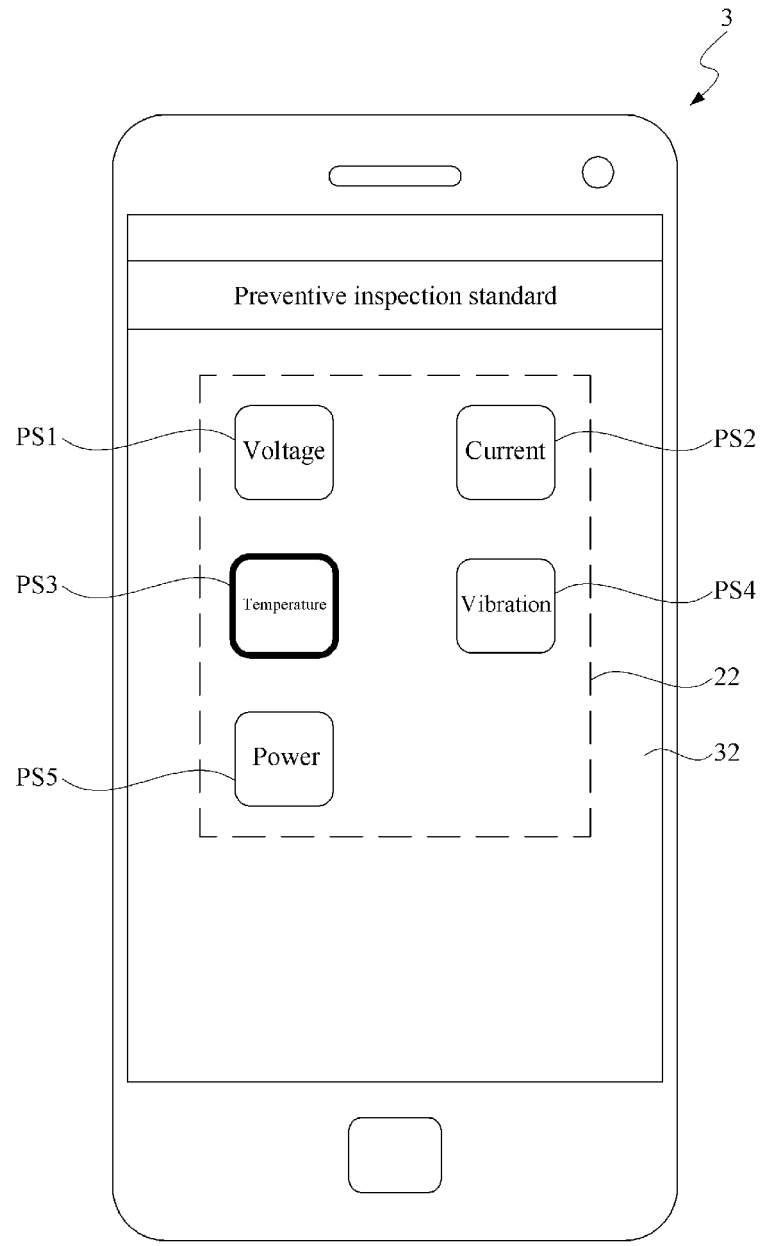
FIG. 2 demonstrates schematically typical preventive inspection standards displayed on a user interface module in accordance with the present invention.
Figure 3:
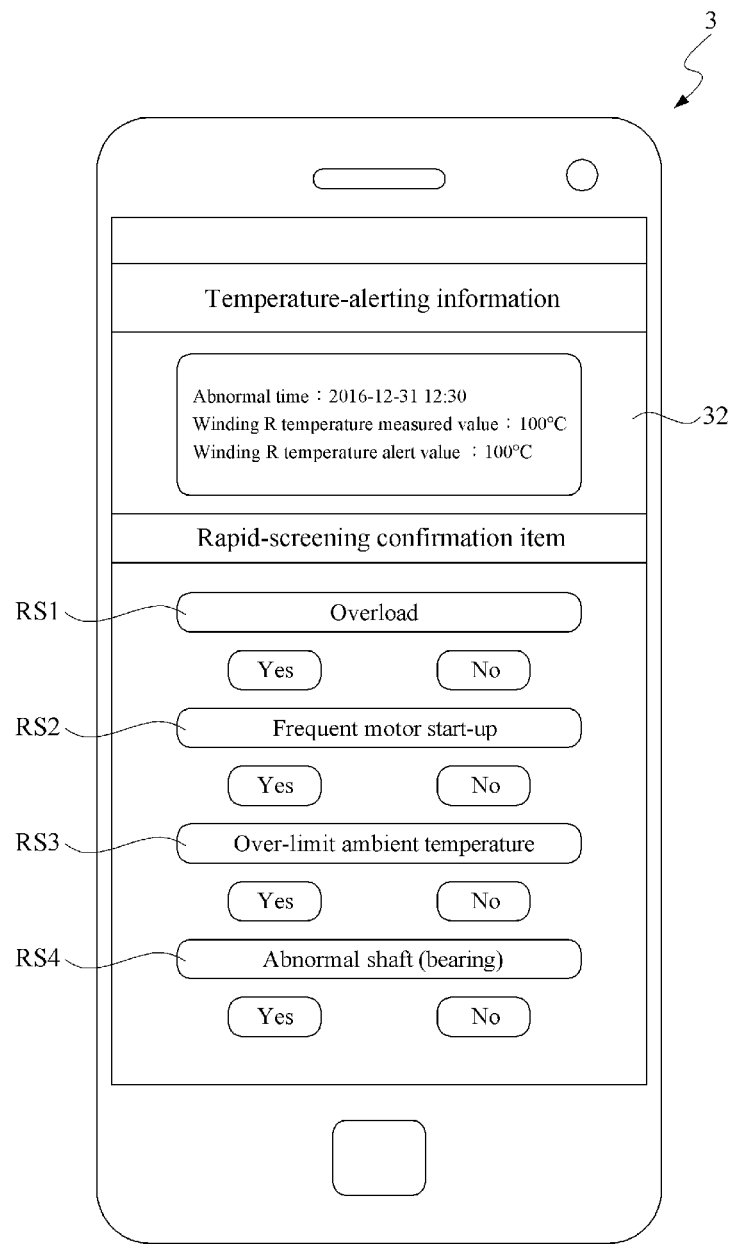
FIG. 3 demonstrates schematically typical rapid-screening confirmation items on the user interface module in accordance with the present invention.

In this embodiment, as shown in FIG. 2, the preventive inspection standard 22 includes a preventive voltage-inspection standard PS1, a preventive current-inspection standard PS2, a preventive temperature-inspection standard PS3, a preventive vibration-inspection standard PS4 and a preventive power-inspection standard PS5. Each of the preventive inspection standards PS1-PS5 is respective to a rapid-screening confirmation item data 23. In this embodiment, as shown in FIG. 3, by having the preventive temperature-inspection standard PS3 as an example, the corresponding rapid-screening confirmation item data includes four rapid-screening confirmation items RS1-RS4, standing for "If overloaded?", "If met a frequent motor start-up?", "If the ambient temperature exceeds the limit?", and "If the shaft (bearing) is abnormal?", respectively.

The preventive temperature-inspection standard PS3 of the rapid-screening confirmation item data 23 records a plurality of rapid-screening results, and each of the rapid-screening results is respective to a preliminary treatment suggestion. Table 1 demonstrates relationships among combinations of the rapid-screening confirmation items, rapid-screening results and the corresponding alert messages of the preliminary treatment suggestions.

TABLE 1

Relationships of the rapid-screening results and the corresponding preliminary treatment suggestions

| Rapid-screening confirmation item | | | | | Alert message |
|---|---|---|---|---|---|
| Over-load | Frequent motor start-up | Over-limit ambient temperature | Abnormal shaft (bearing) | Rapid-screening results | of preliminary treatment suggestion |
| Y | Y | Y | Y | 01 | alert message 01 |
| Y | Y | Y | N | 02 | alert message 02 |
| Y | Y | N | Y | 03 | alert message 03 |
| Y | Y | N | N | 04 | alert message 04 |
| Y | N | Y | Y | 05 | alert message 05 |
| Y | N | Y | N | 06 | alert message 06 |
| Y | N | N | Y | 07 | alert message 07 |
| Y | N | N | N | 08 | alert message 08 |
| N | Y | Y | Y | 09 | alert message 09 |
| N | Y | Y | N | 10 | alert message 10 |
| N | Y | N | Y | 11 | alert message 11 |
| N | Y | N | N | 12 | alert message 12 |
| N | N | Y | Y | 13 | alert message 13 |
| N | N | Y | N | 14 | alert message 14 |
| N | N | N | Y | 15 | alert message 15 |
| N | N | N | N | 16 | alert message 16 |

In addition, the memory module 2 is further to store the inspection data 24 experienced the statistic calculation process by the inspection-data processing module 121.

The portable communication device 3, carried with the portable inspection-device kit 1 by the inspection personnel to the corresponding to-be-inspected positions, includes a track-requirement analyzing module 31, a user interface module 32, a maintenance-period evaluating module 33, a positioning module 34 and a patrol-path planning module 35.

The track-requirement analyzing module 31 can be an analytic calculation chip or a processor installed with and application program for analytic calculation, and is communicatively coupled with the memory module 2 and the inspection-data collecting and transmitting device 12. The track-requirement analyzing module 31 is to analyze whether or not the inspection data 24 has met the preventive inspection standard. If positive, then the track-requirement analyzing module 31 captures the corresponding rapid-screening confirmation item data, and defines the to-be-inspected electromechanical device 200 to be a special-track electromechanical device. Otherwise (i.e., the inspection data 24 is determined to fail to meet the preventive inspection standard), the to-be-inspected electromechanical device 200 would be defined as a regular-track electromechanical device.

In this embodiment, upon when the track-requirement analyzing module 31 determines that the temperature data in the inspection data detected at the to-be-inspected electromechanical device 200 has reached the preventive temperature-inspection standard PS3, then the to-be-inspected electromechanical device 200 is defined as a special-track electromechanical device so as to indicate that the to-be-inspected electromechanical device 200 requires to be frequently tracked. tracker Otherwise, upon when the track-requirement analyzing module 31 determines that neither of the inspection data of the to-be-inspected electromechanical device 200 reaches any of the preventive voltage-inspection standard PS1, the preventive current-inspection standard PS2, the preventive temperature-inspection standard PS3, the preventive vibration-inspection standard PS4 and the preventive power-inspection standard PS5, it implies that the to-be-inspected electromechanical device 200 is currently operated stably, so that the possibility of any abnormality in a short term is extremely low. Thus, this to-be-inspected electromechanical device 200 can be defined as the regular-track electromechanical device, which requires only regular or periodical inspections proposed in the service handbook.

The user interface module 32, electrically coupled with the track-requirement analyzing module 31 and the memory module 2, includes a display interface 321, an operation interface 322 and a report-producing interface 323. The display interface 321 and the operation interface 322 can be integrated ad a touch display interface, i.e., a touch display panel. The report-producing interface 323 can be an interface installed with a report-generating program to be integrated on the touch display interface.

The display interface 321 of the user interface module 32 can be applied to display the rapid-screening confirmation item in the rapid-screening confirmation item data 23 respective to the preventive inspection standard 22. By having embodiments shown in FIG. 2 and FIG. 3 as typical examples, after the track-requirement analyzing module 31 analyzes and then determines that the temperature data in the inspection data obtained from inspecting the to-be-inspected electromechanical device 200 has reached the preventive temperature-inspection standard PS3, then the display interface 321 of the user interface module 32 shows four rapid-screening confirmation items RS1-RS4. Thereupon, the inspection personnel can utilize the operation interface 322 (integrating the display interface 321 into the touch display interface) to carry out an interactive operation.

Figure 4A:
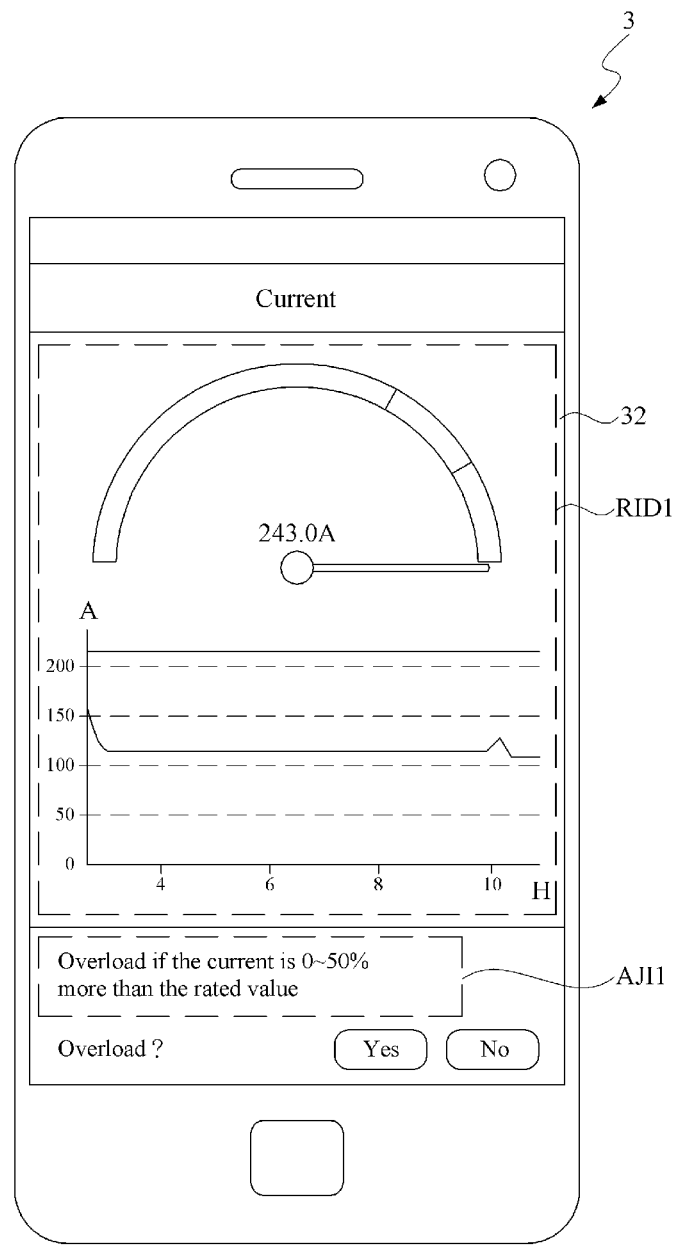
FIG. 4A to FIG. 4D demonstrate schematically and individually typical related inspection data and corresponding supportive judgment-alerting messages on the user interface module in accordance with the present invention.

During the interactive operation, when the inspection personnel selects a current confirmed item out of the plurality of rapid-screening confirmation items, the track-requirement analyzing module 31 captures the related inspection data and the supportive judgment-alerting message from the memory module 2, with respect to the current confirmed item, and displays the aforesaid data and message on the display interface. As shown in FIG. 3 and FIG. 4A, when the inspection personnel picks the rapid-screening confirmation item RS1 as the current confirmed item out of these four rapid-screening confirmation items RS1-RS4, the track-requirement analyzing module 31 captures the related inspection data RID1 from the memory module 2, with respect to the rapid-screening confirmation item RS1; i.e., to capture the related inspection data for judging if an overloaded is met, and to capture the supportive judgment-alerting message AJI1 judging an overload. As shown in FIG. 4A, the related inspection data RID1 is the current inspection data, and the supportive judgment-alerting message AJI1 records the information of "Overload if the current is 0-50% more than the rated value".

Figure 4B:
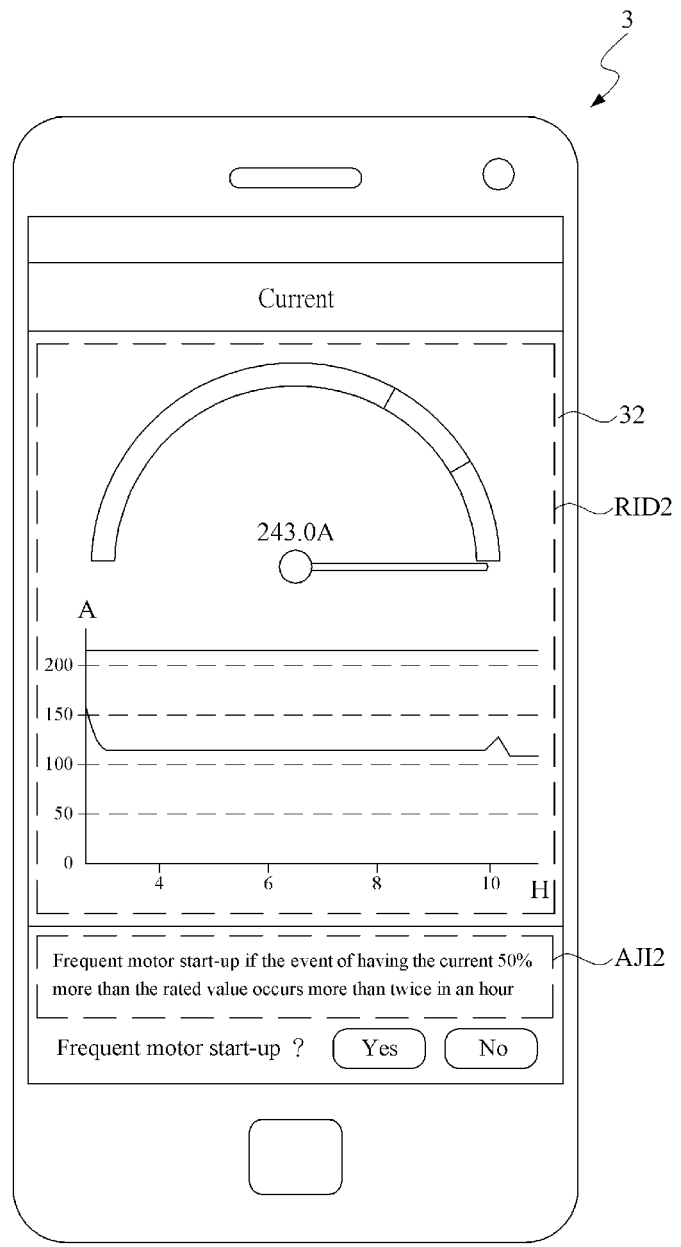

As shown in FIG. 3 and FIG. 4B, when the inspection personnel clicks the rapid-screening confirmation item RS2 as the current confirmed item out of these four rapid-screening confirmation items RS1-RS4, the track-requirement analyzing module 31 captures the related inspection data RID2 related to the rapid-screening confirmation item RS2 from the memory module 2. Namely, the related inspection data related to determine if a situation of frequent motor start-up is met is captured, and also the supportive judgment-alerting message AJI2 related to determine if the situation of frequent motor start-up is met is captured. As shown in FIG. 4B, the related inspection data RID2 is the current inspection data, and the supportive judgment-alerting message AJI2 records the information of "Frequent motor start-up if the event of having the current 50% more than the rated value occurs more than twice in an hour".

Figure 4C:
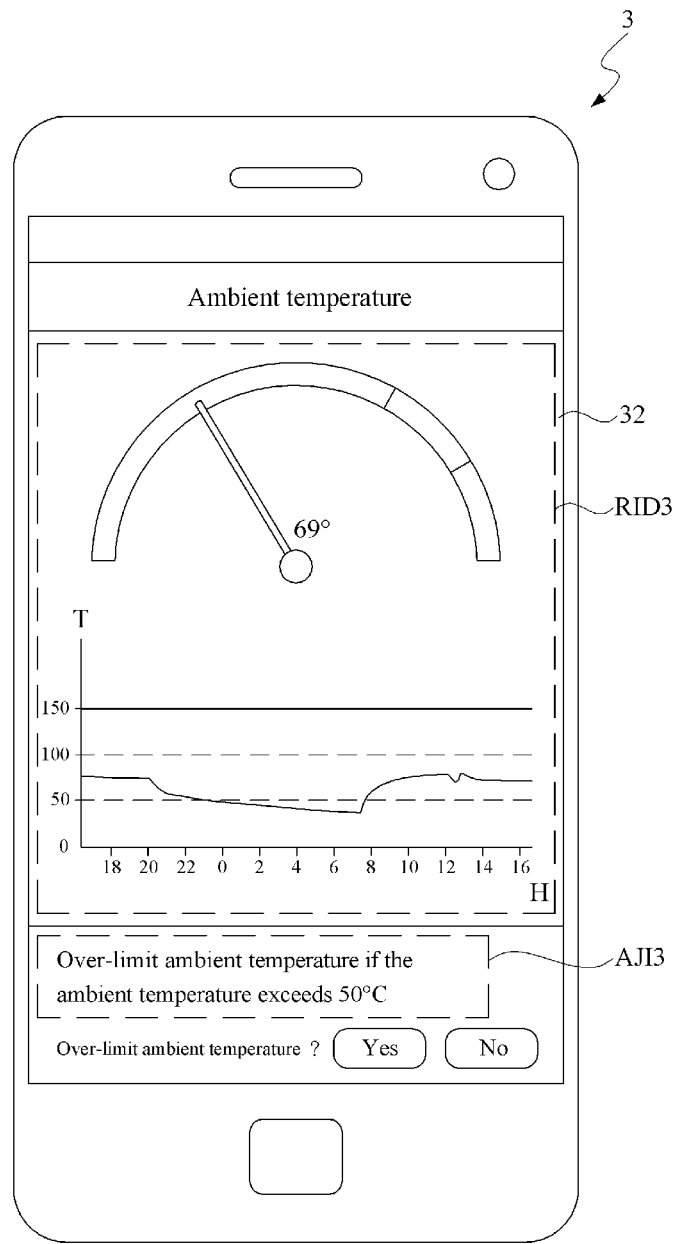

As shown in FIG. 3 and FIG. 4C, when the inspection personnel clicks the rapid-screening confirmation item RS3 as the current confirmed item out of these four rapid-screening confirmation items RS1-RS4, the track-requirement analyzing module 31 captures the related inspection data RID3 related to the rapid-screening confirmation item RS3 from the memory module 2. Namely, the related inspection data related to determine if an ambient temperature is too high is captured, and also the supportive judgment-alerting message AJI3 related to determine if the ambient temperature is too high. As shown in FIG. 4C, the related inspection data RID3 is the inspection data of ambient temperature, and the supportive judgment-alerting message AJI3 records the information of "Over-limit ambient temperature if the ambient temperature exceeds 50° C.".

Figure 4D:
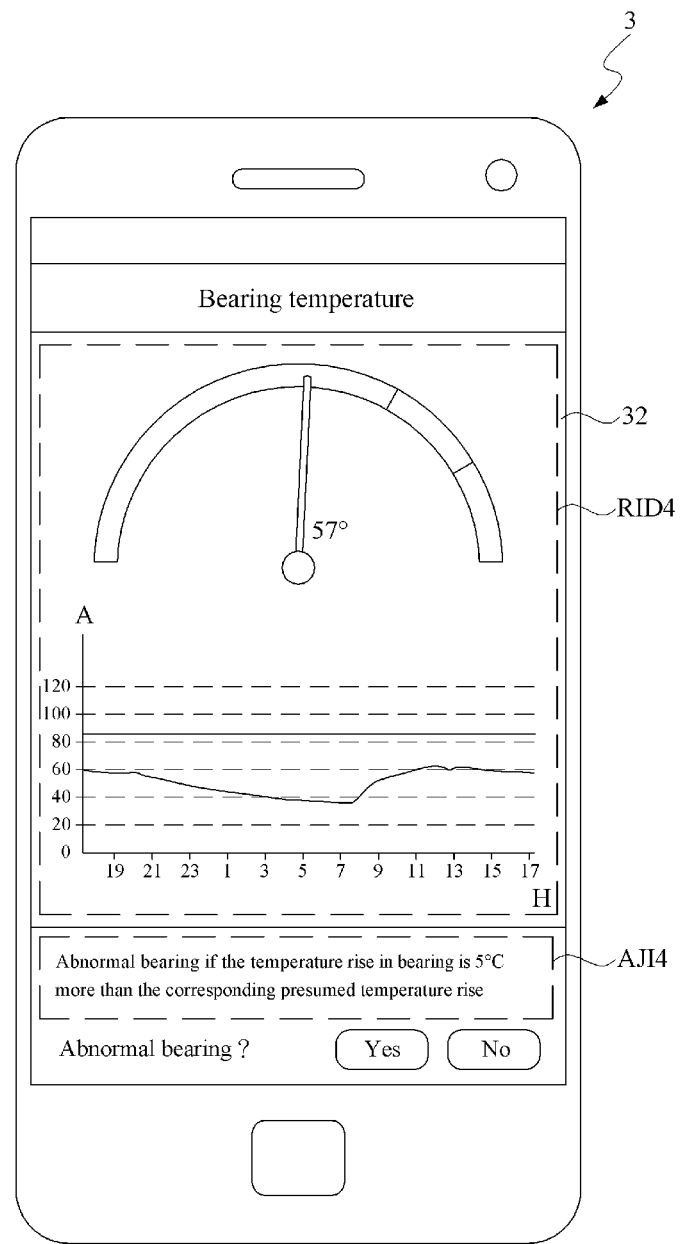

As shown in FIG. 3 and FIG. 4D, when the inspection personnel clicks the rapid-screening confirmation item RS4 as the current confirmed item out of these four rapid-screening confirmation items RS1-RS4, the track-requirement analyzing module 31 captures the related inspection data RID4 related to the rapid-screening confirmation item RS4 from the memory module 2. Namely, the related inspection data related to determine if a bearing is abnormal is captured, and also the supportive judgment-alerting message AJI4 related to determine if the bearing is abnormal. As shown in FIG. 4D, the related inspection data RID4 is the inspection data of bearing temperature, and the supportive judgment-alerting message AJI4 records the information of "Abnormal bearing if the temperature rise in bearing is 5° C. more than the corresponding presumed temperature rise".

Figure 5:
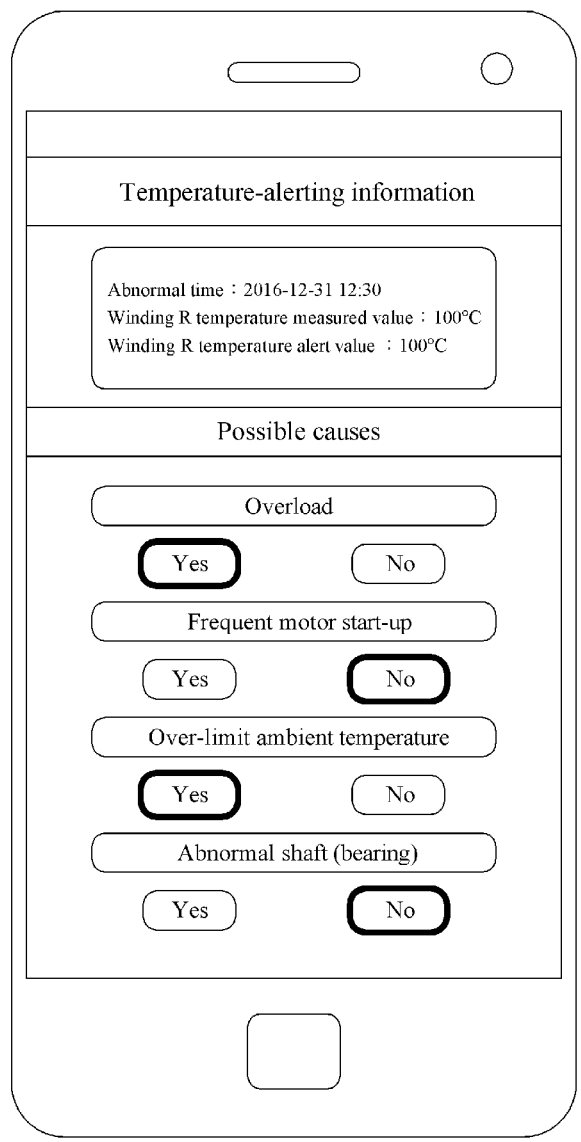
FIG. 5 demonstrates schematically real rapid-screening results on the user interface module in accordance with the present invention.
Figure 6:
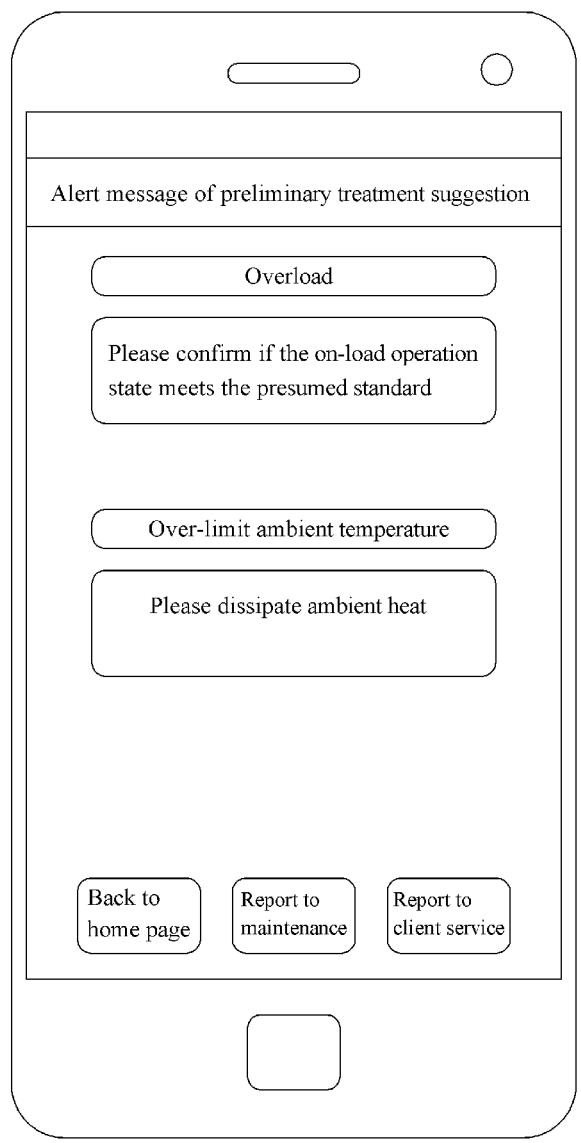
FIG. 6 demonstrates schematically a preliminary treatment suggestion on the user interface module with respect to the real rapid-screening results in accordance with the present invention.

From FIG. 3-FIG. 4D, it is shown that the inspection personnel can refer the related inspection data RID1-RID4 and the supportive judgment-alerting messages AJI1-AJI4 to Table 1, and can rapidly screen a real rapid-screening result out of the 16 rapid-screening results. As shown in FIG. 5, in this embodiment, the two real rapid-screening results rapidly screened by the inspection personnel are "Overload" and "Over-limit ambient temperature", then, from Table 1, it is found that the rapid-screening result 06 out of the 16 rapid-screening results is located. At this time, the user interface module 32 would display that the corresponding preliminary treatment suggestion is exactly the alert message 06. As shown in FIG. 6, the alert message 06 records "Please confirm if the on-load operation state meets the presumed standard" and "Please dissipate ambient heat".

After the inspection personnel reads the preliminary treatment suggestion, a preliminary treatment operation can be performed, and the related data (data of the preliminary treatment operation) would be stored into the memory module 2 so as to form a processing historical data 25. In this embodiment, the preliminary treatment suggestion (i.e., the alert message 06) records "Please confirm if the on-load operation state meets the presumed standard" and "Please dissipate ambient heat". Thus, the preliminary treatment operation performed by the inspection personnel would include the preliminary treatment operation "Down load"

and "Open the air vent to dissipate ambient heat". After the preliminary treatment operation is done, the data of the preliminary treatment operation including "Down load" and "Open the air vent to dissipate ambient heat" would be transmitting to and then store into the memory module 2 so as to form a processing historical data.

Referring back to FIG. 1, the maintenance-period evaluating module 33 in the portable communication device 3 can be a maintenance-period evaluating and calculating chip or a processor installed with a maintenance-period evaluating and calculating application program. The maintenance-period evaluating module 33 is electrically coupled with the track-requirement analyzing module 31. Upon when the track-requirement analyzing module 31 determines that the inspection data 24 has reached the preventive inspection standard 22, the maintenance-period evaluating module 33 would evaluate the inspection data 24 and the preventive inspection standard 22 to locate a priority maintenance period of the special-track electromechanical device. On the other hand, upon when the track-requirement analyzing module 31 determines that the inspection data 24 doesn't reach the preventive inspection standard 22, the maintenance-period evaluating module 33 would evaluate the inspection data 24 and the preventive inspection standard 22 to locate a regular maintenance period of the regular-track electromechanical device. In this embodiment, the priority maintenance period and the regular maintenance period can be both called as the maintenance-period evaluation data 27. The maintenance-period evaluating module 33 can further record the maintenance-period evaluation data 27 (i.e., the priority maintenance period and the regular maintenance period) into the memory module 2.

In this embodiment, referring to Table 2, five electromechanical devices (No. 1-No. 5) are arranged to be inspected by the inspection personnel. After the inspection personnel obtained the inspection data, the maintenance-period evaluating module 33 would evaluate the inspection data 24 and the preventive inspection standard 22 to determine the corresponding maintenance periods individually for these five electromechanical devices, listed in Table 2. As shown, the electromechanical device No. 3 is determined to be the electromechanical device defined as one special-track electromechanical device, and the rest of the electromechanical devices, including No. 1-2 and 4-5, are determined to be regular-track electromechanical devices. Then, the maintenance-period evaluating module 33 evaluates the inspection data 24 and the preventive inspection standard 22 to decide that the maintenance period for the electromechanical device No. 3 is less than a week. Namely, the electromechanical device No. 3 needs intensive patrol-type inspections, and maintenance and service thereupon shall be in schedule as soon as possible. Specifically, the maintenance period for the electromechanical device No. 3 is generally defined as a priority maintenance period. In addition, the maintenance-period evaluating module 33 evaluates the inspection data 24 and the preventive inspection standards 22 for the rest of the electromechanical devices, and then determines that each of the maintenance periods thereto can be larger than three months. Namely, normal or regular patrol-type inspection and track are simply sufficient. Thus, the maintenance period for each of the rest of the electromechanical devices is generally defined as a regular maintenance period.

TABLE 2

Relationship between the maintenance status and the maintenance period

| Number of electromechanical device | Maintenance status | Maintenance period | Requirement of patrol-type inspection |
|---|---|---|---|
| No. 1 | Regular maintenance | >3 months | Regular track/ Once per week |
| No. 2 | Regular maintenance | >3 months | Regular track/ Once per week |
| No. 3 | Special maintenance | <1 week | Special track/ Daily |
| No. 4 | Regular maintenance | >3 months | Regular track/ Once per week |
| No. 5 | Regular maintenance | >3 months | Regular track/ Once per week |

Figure 7:
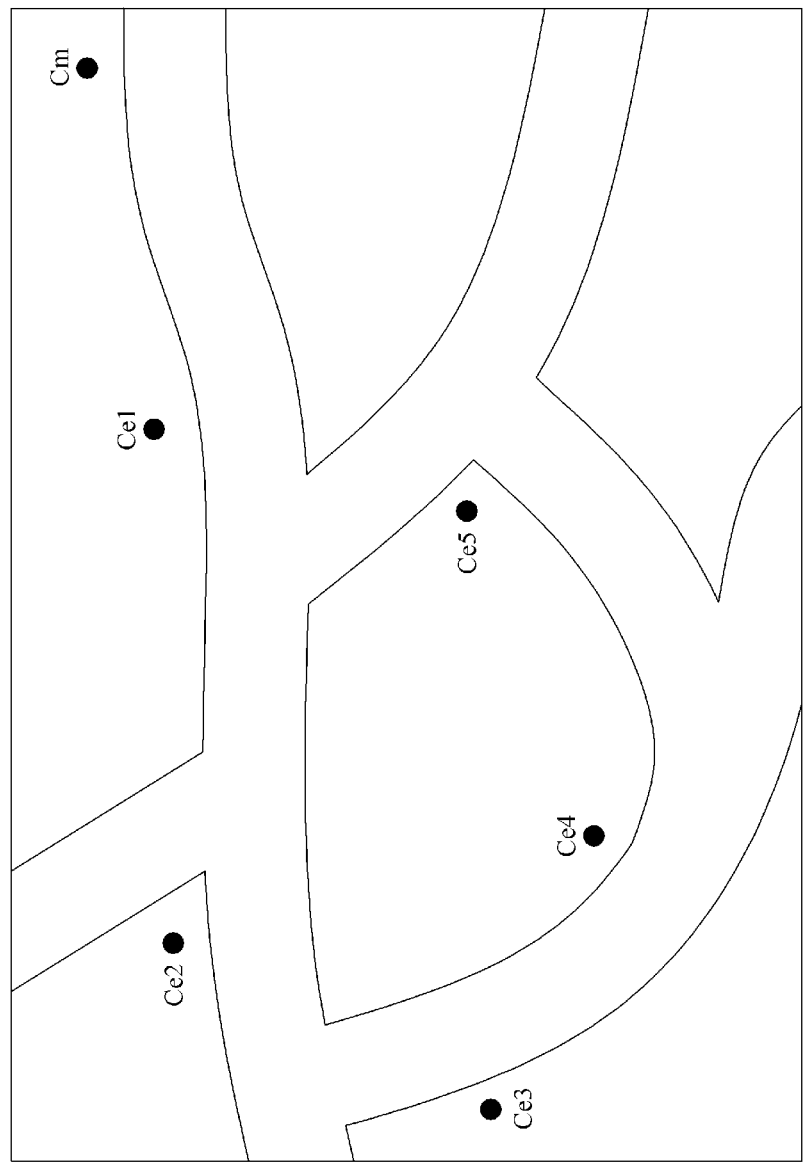
FIG. 7 demonstrates schematically map data, communication-device coordinates and electromechanical-device coordinates on the user interface module in accordance with the present invention.

As shown in FIG. 1 and FIG. 7, in this embodiment, a total number of five electromechanical devices are required to be inspected by the inspection personnel. The memory module 2 is further to store map data like that shown in FIG. 7. These five electromechanical devices are sparsely located to five locations. The positioning module 34 can be a GPS-positioning module, an indoor positioning module such as Bluetooth positioning technology, an outdoor positioning module such as signal strength positioning technology, or any positioning module integrating at least two different positioning technology. The positioning module 34 is used to position these five electromechanical devices so as further to obtain five different electromechanical-device coordinates Ce1, Ce2, Ce3, Ce4 and Ce5, and also to position the portable communication device 3 so as further to obtain a communication-device coordinate Cm.

Figure 8:
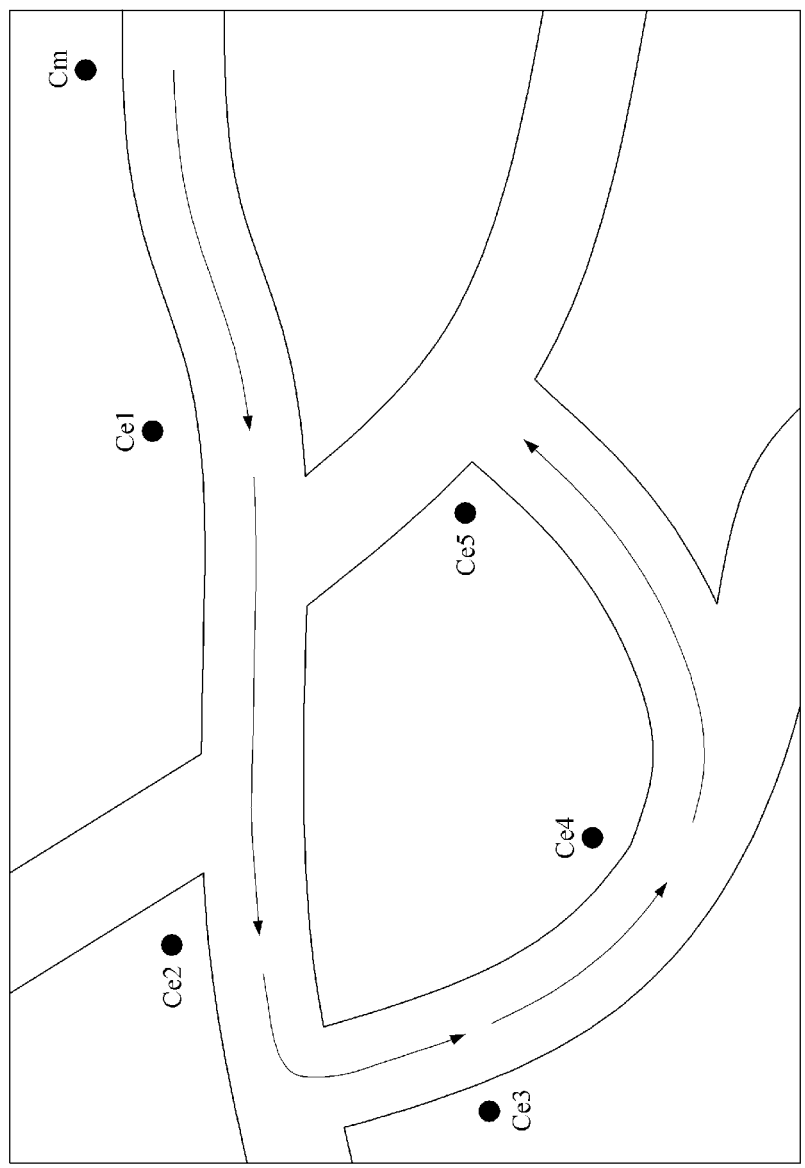
FIG. 8 demonstrates schematically a preset patrol path on the user interface module in accordance with the present invention.

The patrol-path planning module 35 can be a path planning and calculating chip or a processor installed with a path-planning application program, and is electrically coupled with the maintenance-period evaluating module 33 and the positioning module 34. The patrol-path planning module 35 evaluates the communication-device coordinate Cm and the electromechanical-device coordinates Ce1-Ce5 so as to plan in advance a patrol path like the one shown in FIG. 8, in which the patrol path is formed by connecting orderly the communication-device coordinate Cm and the electromechanical-device coordinates Ce1-Ce5. In addition, by having the patrol path marked on the map data for forming a patrol-type map data 26 to be stored in the memory module 2. While the inspection personnel operates the user interface module 32, the patrol-type map data 26 would be shown on the user interface module 32.

In order further to devote reasonably human and material resources into the patrol-type inspections, after the inspection personnel finished the inspection upon the to-be-inspected electromechanical device 200, the patrol-path planning module 35 would base on the maintenance period (either the priority maintenance period or the regular maintenance period) proposed by the maintenance-period evaluating module 33 to re-plan the patrol path. In this embodiment, the maintenance period for the electromechanical device No. 3 is a priority maintenance period, while the maintenance period for any of the other electromechanical devices is a regular maintenance period.

Figure 9:
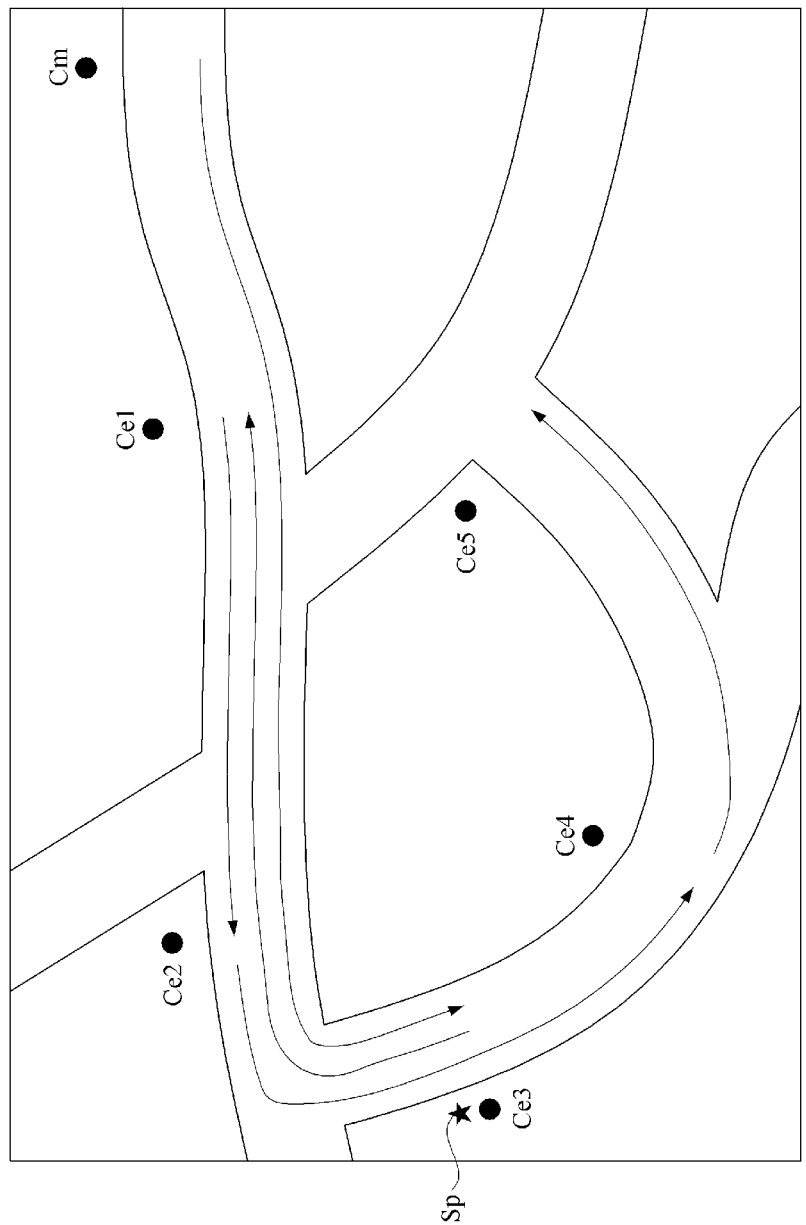
FIG. 9 demonstrates schematically a re-planned patrol path on the user interface module in accordance with the present invention.

Then, the patrol-path planning module 35 bases on the communication-device coordinate Cm, the electromechanical-device coordinates Ce1-Ce5, and the priority or regular maintenance period of the to-be-inspected electromechanical device to re-plan the patrol path into a patrol path like the one shown in FIG. 9. In particular, the patrol path can be formed by connecting orderly the communication-device coordinate Cm, the electromechanical-device coordinates Ce3, Ce1, Ce2, Ce4 and Ce5.

As the track-requirement analyzing module 33 defines the to-be-inspected electromechanical device 200 as a special-track electromechanical device, the patrol-path planning module 35 can be further used for capturing the electromechanical-device coordinate with respect to the special-track electromechanical device so as to obtain a special-track electromechanical-device coordinate. In this embodiment, the electromechanical-device coordinate Ce3 is the special-track electromechanical-device coordinate, and, in the patrol path, the special-track electromechanical-device coordinate (i.e., the electromechanical-device coordinate Ce3) is marked by a special-track flag Sp. In addition, when the inspection personnel operates the user interface module 32, both the patrol-type map data 26 and the special-track flag Sp are displayed on the user interface module 32.

Figure 10:
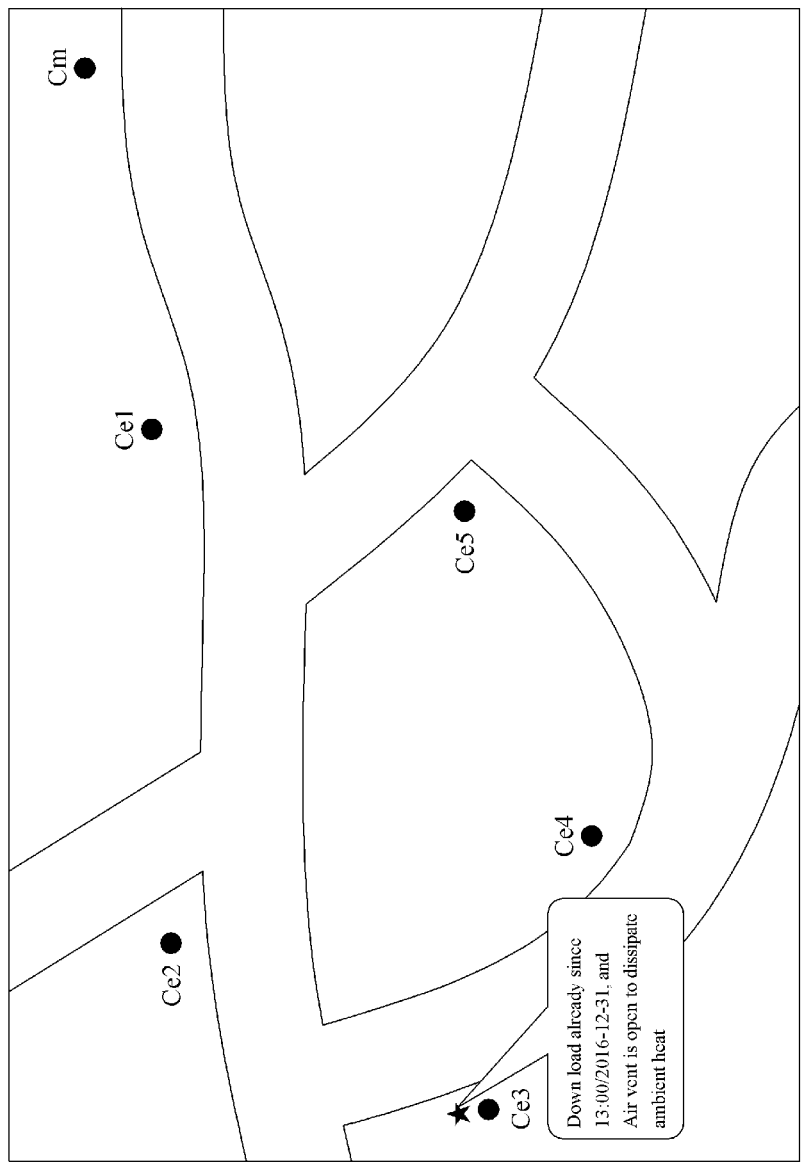
FIG. 10 demonstrates schematically processing historical data of a special-track electromechanical device on the user interface module in accordance with the present invention.

As shown in FIG. 1 and FIG. 10, when the user interface module 32 detects that the inspection personnel clicks the special-track flag Sp, the user interface module 32 would display the processing historical data 25 of the special-track electromechanical device with respect to the special-track flag Sp.

Preferably, the report-producing interface 323 of the user interface module 32 is provided for the inspection personnel to capture at least one of the basic electromechanical-device information 21, the inspection data 22, the real rapid-screening result, processing historical data 25, the priority maintenance period, the regular maintenance period and the patrol-type map data 26 stored in the memory module 2, so as to generate a patrol-type inspection report. The patrol-type inspection report can be in a data file format to be transmitted to a remote server, or to be further forwarded to other network terminal or mobile communication device.

To summarize the aforesaid exemplary examples, the skilled in the art would easily understand that the patrol-type preventive inspection system for electromechanical devices 100 provided by the present invention can reach at least the following advantages. Firstly, in the patrol-type preventive inspection system 100, since the patrol-path planning module 35 can be used to plan the patrol path, and further the user interface module 32 can obtain the basic electromechanical-device information 21, the processing historical data 25 and the patrol-type map data 26 from the memory module 2; thus, any inspection personnel, familiar with the real situations or not, can be rapidly aware where to find the electromechanical device, and what the inspection and the situation to be handled are, such that better flexibility in personnel arrangement can be provided. In addition, since the inspection or patrol path is determined by referring to the maintenance period, thus major human resource in inspection personnel can be provided to the special-track electromechanical devices that need intensive maintenance, such that limited resources can be effectively allotted.

Secondly, in the patrol-type preventive inspection system 100, since the portable inspection-device kit 1 and the portable communication device 3 are carried by the inspection personnel to travel along the patrol path, thus no in-situ inspection device is needed to each electromechanical device. Thereby, expense on purchasing, installing and calibrating the inspection devices can be significantly reduced.

Thirdly, since the inspection device 11 and the inspection-data collecting and transmitting device 12 of the portable inspection-device kit 1 and the portable communication device 3 are also carried by the inspection personnel to travel along the patrol path, the patrol-type preventive inspection system 100 can still work, even at a situation of losing network connection with a remote server. According to the present invention, as long as the inspection personnel brings the inspection-data collecting and transmitting device and the portable communication device to a place that a network connection with the remote server can be established, then all the inspection data as well as other related information can be still forwarded to the remote server. Thus, even under severe circumstances without reliable network or communication connection, monitoring and management upon plenty electromechanical devices can be still performed.

While the present invention has been particularly shown and described with reference to a preferred embodiment, it will be understood by those skilled in the art that various changes in form and detail may be without departing from the spirit and scope of the present invention.

What is claimed is:

1. A patrol-type preventive inspection system for electromechanical devices, provided for an inspection personnel to perform patrol-type inspections upon a plurality of electromechanical devices along a patrol path, comprising:

a portable inspection-device kit, provided for the inspection personnel to carry along the patrol path to a position of an electromechanical device for inspection out of the plurality of electromechanical devices, including:
at least one inspection device, configured to be mounted onto at least one portion of the electromechanical device to detect at least one inspection data of the electromechanical device;
an inspection-data collecting and transmitting device, communicatively coupled with the at least one inspection device, being to collect and transmit the at least one inspection data; and
a memory module, communicatively coupled with the inspection-data collecting and transmitting device to receive and store the at least one inspection data, recording a plurality of electromechanical-device positions respective to the plurality of electromechanical devices, recording a basic electromechanical-device information and at least one preventive inspection standard of each of the plurality of electromechanical devices, each of the at least one preventive inspection standard being respective to a rapid-screening confirmation item data, the rapid-screening confirmation item data recording a plurality of rapid-screening results, each of the plurality of rapid-screening results being respective to a preliminary treatment suggestion; and a portable communication device, provided for the inspection personnel to carry with the portable inspection-device kit to the position, including:
a track-requirement analyzing module, communicatively coupled with the memory module and the inspection-data collecting and transmitting device, being to capture at least one rapid-screening confirmation item data and to define the electromechanical device as a special-track electromechanical device upon when the at least one inspection data reaches the at least one preventive inspection standard, being to define the electromechanical device as a regular-track electromechanical device upon when the at least one inspection data doesn't reach the at least one preventive inspection standard;
a user interface module, electrically coupled with the track-requirement analyzing module and the memory module, to display the rapid-screening confirmation item data, provided for the inspection personnel to perform an interactive operation to generate a real rapid-screening result out of the plurality of rapid-screening results, to display one of the plurality of preliminary treatment suggestions with respect to the real rapid-screening result for the inspection personnel to read, to perform a preliminary treatment operation and store data of the preliminary treatment operation into the memory module to form a processing historical data;

a maintenance-period evaluating module, electrically coupled with the track-requirement analyzing module, being to evaluate the at least one inspection data and the at least one preventive inspection standard to determine a priority maintenance period of the special-track electromechanical device upon when the track-requirement analyzing module analyzes that the at least one inspection data has reached the at least one preventive inspection standard, being to evaluate the at least one inspection data and the at least one preventive inspection standard to determine a regular maintenance period of the regular-track electromechanical device upon when the track-requirement analyzing module analyzes that the at least one inspection data has not reached the at least one preventive inspection standard, recording the priority maintenance period and the regular maintenance period into the memory module;

a positioning module, provided to position the plurality of electromechanical-device positions to obtain a plurality of electromechanical-device coordinates, provided to position the portable communication device to obtain a communication-device coordinate; and a patrol-path planning module, electrically coupled with the maintenance-period evaluating module and the positioning module, being to re-plan the patrol path according to the communication-device coordinate, the plurality of electromechanical-device coordinates, the priority maintenance period or the regular maintenance period of the electromechanical device.

2. The patrol-type preventive inspection system for electromechanical devices of claim 1, wherein the memory module is furnished in the portable communication device, the at least one preventive inspection standard stores in the memory module includes at least one of a preventive voltage-inspection standard, a preventive current-inspection standard, a preventive temperature-inspection standard, a preventive vibration-inspection standard and a preventive power-inspection standard.

3. The patrol-type preventive inspection system for electromechanical devices of claim 1, wherein the rapid-screening confirmation item data stored in the memory module includes a plurality of rapid-screening confirmation items, each of the plurality of rapid-screening confirmation items is respective to a related inspection data and a supportive judgment-alerting message in the at least one inspection data, and the user interface module includes:

a display interface, for displaying the rapid-screening confirmation item; and an operation interface, provided for the inspection personnel to perform the interactive operation; while in performing the interactive operation, when the inspection personnel clicks one current confirmed item out of the plurality of rapid-screening confirmation items, the track-requirement analyzing module capturing the related inspection data and the supportive judgment-alerting message from the memory module with respect to the current confirmed item, and displaying the related inspection data and the supportive judgment-alerting message on the display interface.

4. The patrol-type preventive inspection system for electromechanical devices of claim 1, wherein the memory module further stores a map data, the patrol-path planning module further marks the patrol path on the map data to form a patrol-type map data, and the patrol-type map data is stored in the memory module, so that, when the inspection personnel operates the user interface module, the patrol-type map data is displayed on the user interface module.

5. The patrol-type preventive inspection system for electromechanical devices of claim 4, wherein the patrol-path planning module further captures one of the plurality of electromechanical-device coordinates with respect to the special-track electromechanical device to obtain a special-track electromechanical-device coordinate upon when the track-requirement analyzing module defines the electromechanical device to be the special-track electromechanical device, a special-track flag is marked at the special-track electromechanical-device coordinate in the patrol path, and the patrol-type map data and the special-track flag are displayed on the user interface module upon when the inspection personnel operates the user interface module.

6. The patrol-type preventive inspection system for electromechanical devices of claim 5, wherein the user interface module further displays the processing historical data of the special-track electromechanical device with respect to the special-track flag upon when the user interface module detects that the inspection personnel clicks the special-track flag.

7. The patrol-type preventive inspection system for electromechanical devices of claim 1, wherein the inspection-data collecting and transmitting device is a gateway, and communicatively coupled with the portable communication device through a nearby wireless communication technology; wherein the nearby wireless communication technology is one of a WiFi wireless communication technology, a Bluetooth wireless communication technology and a Zigbee wireless communication technology.

8. The patrol-type preventive inspection system for electromechanical devices of claim 1, wherein the user interface module further includes a report-producing interface, the report-producing interface is provided for the inspection personnel to operate and capture at least one of the basic electromechanical-device information, the at least one inspection data, the real rapid-screening result, the processing historical data, the priority maintenance period, the regular maintenance period and the patrol-type map data stored in the memory module to generate a patrol-type inspection report.

* * * * *